(12) United States Patent
Hung

(10) Patent No.: US 6,482,492 B1
(45) Date of Patent: Nov. 19, 2002

(54) SPACERMESH STRUCTURE FOR SHOEMAKING

(76) Inventor: Wen-Yau Hung, 13F, No. 25, Fu-Shung St., Taichung City (TW)

( * ) Notice: Subject to any disclaimer, the term of this patent is extended or adjusted under 35 U.S.C. 154(b) by 0 days.

(21) Appl. No.: 09/866,112

(22) Filed: May 25, 2001

(51) Int. Cl.[7] .............................. B32B 3/14; B32B 3/16; A43B 7/06
(52) U.S. Cl. ......................... 428/55; 428/460; 36/107; 36/3 R; 36/3 A
(58) Field of Search ..................... 428/67, 221, 304.4, 428/411.1, 426, 430, 435, 438, 441, 457, 460, 461, 458, 54, 55; 36/107, 3 R, 3 A

(56) References Cited

U.S. PATENT DOCUMENTS

| | | | | |
|---|---|---|---|---|
| 4,813,158 A | * | 3/1989 | Brown | ........................ 36/114 |
| 6,231,946 B1 | * | 5/2001 | Brown et al. | ................ 404/134 |
| 6,401,364 B1 | * | 6/2002 | Burt | ............................. 36/3 A |

* cited by examiner

Primary Examiner—James J. Seidleck
Assistant Examiner—Travis B. Ribar
(74) Attorney, Agent, or Firm—Charles E. Baxley

(57) ABSTRACT

A spacemesh structure for shoe making includes an upper mesh-texture layer, a lower mesh-texture layer and a reinforced structure in between. The reinforced structure comprises a plurality of supporting lumps arranged as a two dimensional array with gaps between two supporting lumps. A plurality of girders are disposed in the gaps in one direction leaving some gaps between every two adjacent lumps located between two adjacent girders.

2 Claims, 4 Drawing Sheets

SPACERMESH STRUCTURE FOR SHOEMAKING

FIELD OF THE INVENTION

This invention relates to a spacermesh structure for shoemaking, and more specifically to a structure for reinforcing an intermediate layer in a sandwich structure used for shoemaking.

BACKGROUND OF THE INVENTION

The conventional spacermesh structure for shoemaking is usually composed of upper and lower mesh-texture layers as well as an air-permeable and flexible intermediate intensive texture. The structure often has insufficient strength, poor plasticity and durability when the shoes are under larger deformation. Such a structure is thus compressed in its applicable field to some extent in spite of its nature.

SUMMARY OF THE INVENTION

The primary object of this invention is to provide a spacermesh structure for shoemaking. According to the invention, the intermediate intensive texture of a conventional sandwich structure is replaced by a reinforced intermediate layer to strengthen the sandwich structure. The reinforced intermediate layer comprises a plurality of supporting lumps arranged as a two dimensional array having gaps between lumps. A plurality of elongated supporting girders are disposed in the gaps to reinforce the sandwich structure. The girders may be ropes, flexible bands, foam plastic strips, spring coils or metallic bars. The unfilled gaps in the sandwich structure provides air flow for the shoes.

BRIEF DESCRIPTION OF THE DRAWINGS

The related drawings in connection with the detailed description of this invention, which is to be made later, are described briefly as follows, in which.

DETAILED DESCRIPTION OF THE INVENTION

Figure 1:
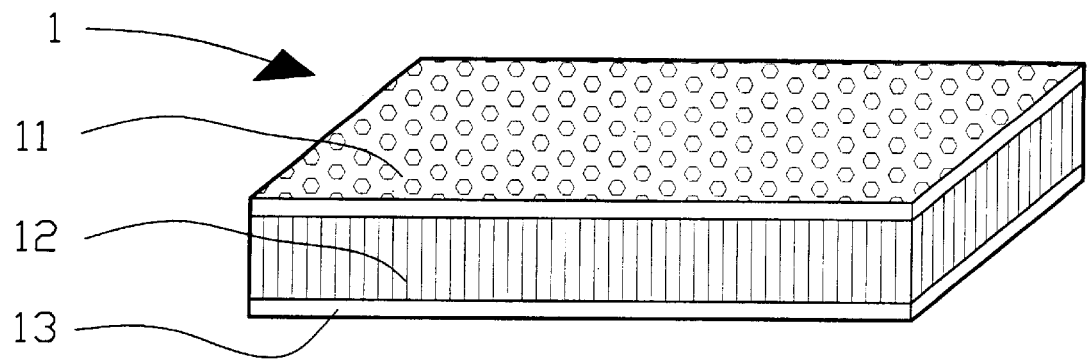
FIG. 1 shows a conventional spacermesh structure for shoemaking.
Figure 2:
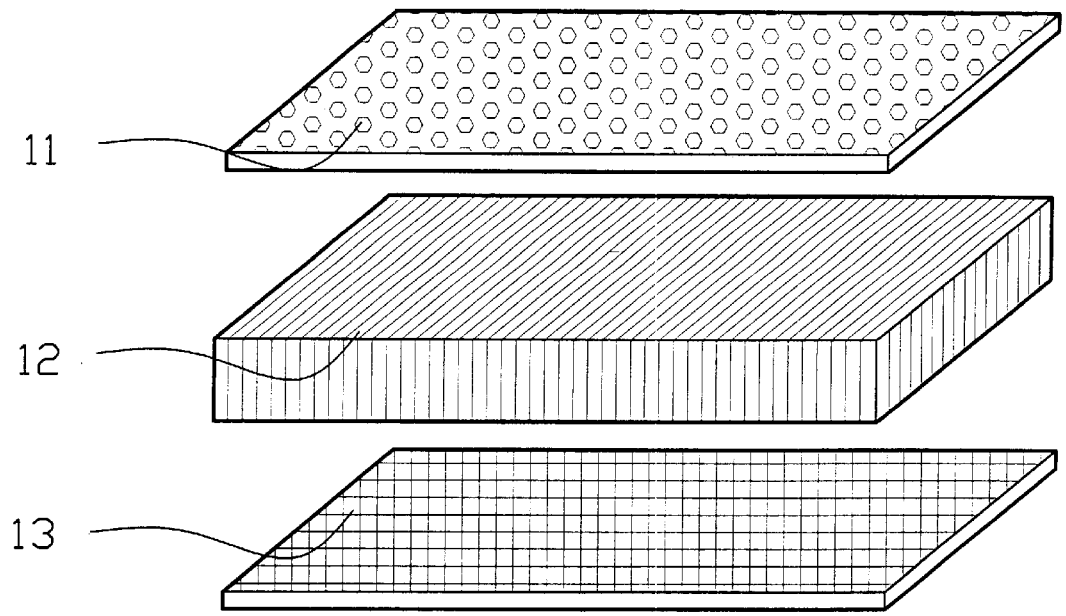
FIG. 2 is an exploded view of the conventional spacermesh structure.
Figure 3:
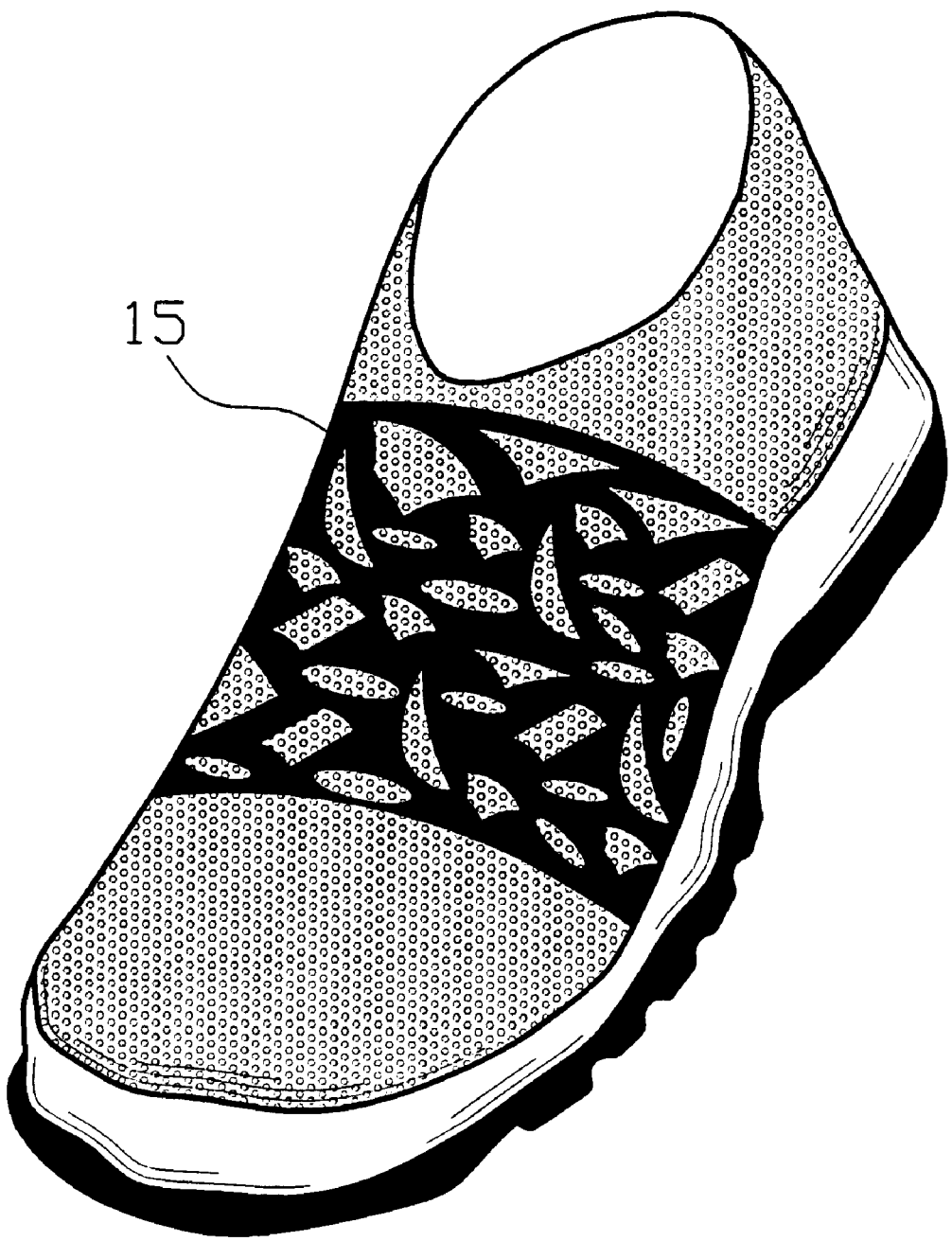
FIG. 3 shows an embodiment of the conventional spacermesh structure.

As illustrated in FIGS. 1 and 2, a conventional spacermesh structure (1) for shoemaking usually comprises an upper mesh-texture layer (11), an intermediate intensive texture layer (12), and a lower mesh-texture layer (13) to form a kind of soft shoe stuff with excellent air-permeability. However, a sandwich structure like this is particularly insufficient in structural strength and weak in wrapping fitness that it would deform too much to keep itself in place accordingly.

To improve the strength of a shoe, a relatively stronger plastic strip (15) or similar structure is often applied on the vamp for reinforcement. However, the plastic strip (15) does not provide much strength or support to the shoe in practice.

Figure 4:
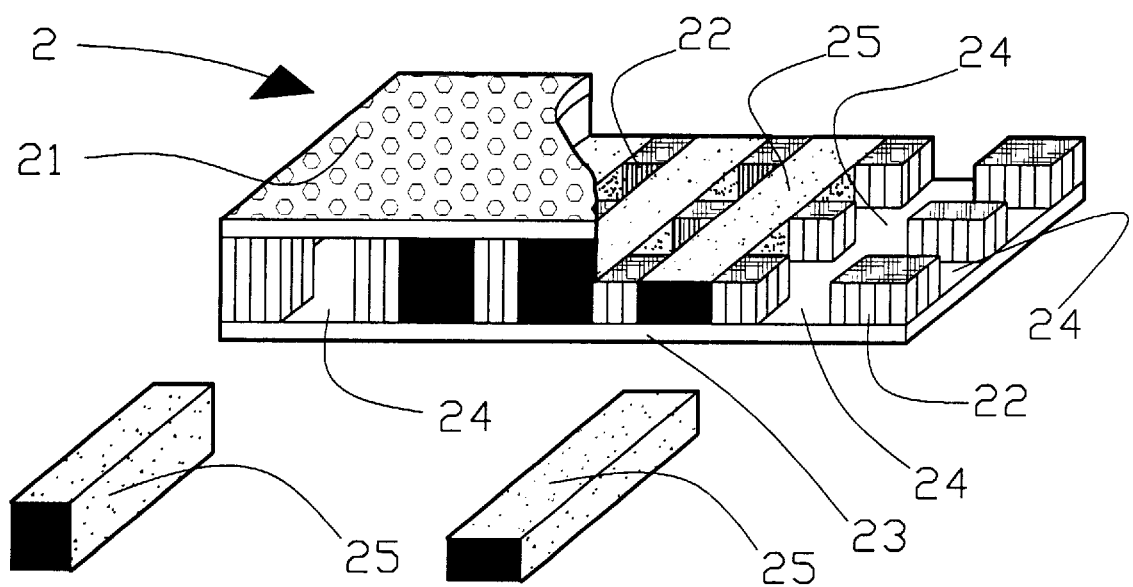
FIG. 4 is a cutaway sectional view of a reinforced spacermesh structure of this invention.

With reference to FIG. 4, the spacermesh structure of this invention has a frame work (2) as shown in the figure. The structure comprises an upper mesh-texture layer (21), and a lower mesh-texture layer (23). Between the upper and lower mesh-texture layers is a reinforced intermediate layer comprising a plurality of supporting lumps (22). As can be seen in FIG. 4, the lumps are arranged as a two dimensional array. There are gaps (24) between adjacent lumps (22). The gaps form a plurality of streets in orthogonal directions. In order to provide more strength, a plurality of elongated girders (25) are disposed in the gaps in one direction leaving some gaps remaining in the sandwich structure as shown in FIG. 4. In other words, between each two elongated girders (25), there are gaps (24) between every two supporting lumps (22). The girders may be ropes, flexible bands, foam plastic strips, spring coils or metallic bars. The unfilled gaps in the sandwich structure provides air flow for the shoes. In the preferred embodiment as shown in FIG. 4, the girders and the lumps have identical thickness so that the sandwich structure is supported properly and strongly.

Figure 5:
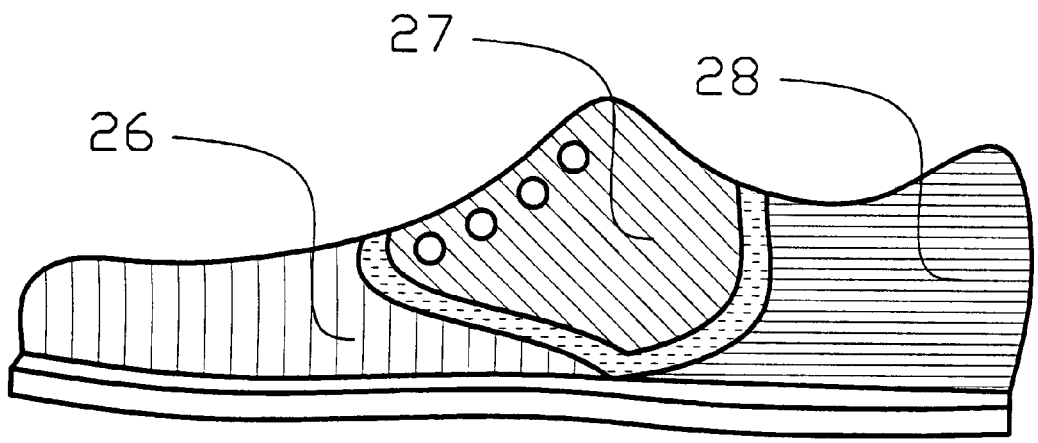
FIG. 5 is a schematic view of an embodiment of this invention.

In an embodiment of this invention shown in FIG. 5, the reinforced spacermesh structure (2) is applied for shoemaking in form of a front segment (26), a middle segment (27), and a rear segment (28) of vamp for consolidating the shoe structure and holding the vamp in due place.

In the above described, at least one preferred embodiment has been described in detail with reference to the drawings annexed, and it is apparent that numerous variations or modifications may be made without departing from the true spirit and scope thereof, as set forth in the claims below.

What is claimed is:

1. A spacemesh structure for shoemaking comprising:
    an upper mesh-texture layer,
    a lower mesh-texture layer; and
    a reinforced intermediate layer between said upper and lower mesh-texture layers,
    said reinforced intermediate layer comprising:
        a plurality of supporting lumps arranged as a two-dimensional array with gaps between every two adjacent supporting lumps, said gaps forming a plurality of streets in two orthogonal directions; and
        a plurality of elongated supporting girders filling streets in one direction and leaving a plurality of gaps between adjacent supporting lumps disposed between two adjacent elongated supporting girders.

2. The spacermesh structure for shoemaking as claimed in claim 1, wherein said elongated supporting girders are ropes, flexible bands, foam plastic strips, plastic strips, spring coils or metallic bars.

* * * * *